Feb. 13, 1934.   A. V. SIMS   1,946,814
HAY DRYING AND THE LIKE
Filed Aug. 20, 1929
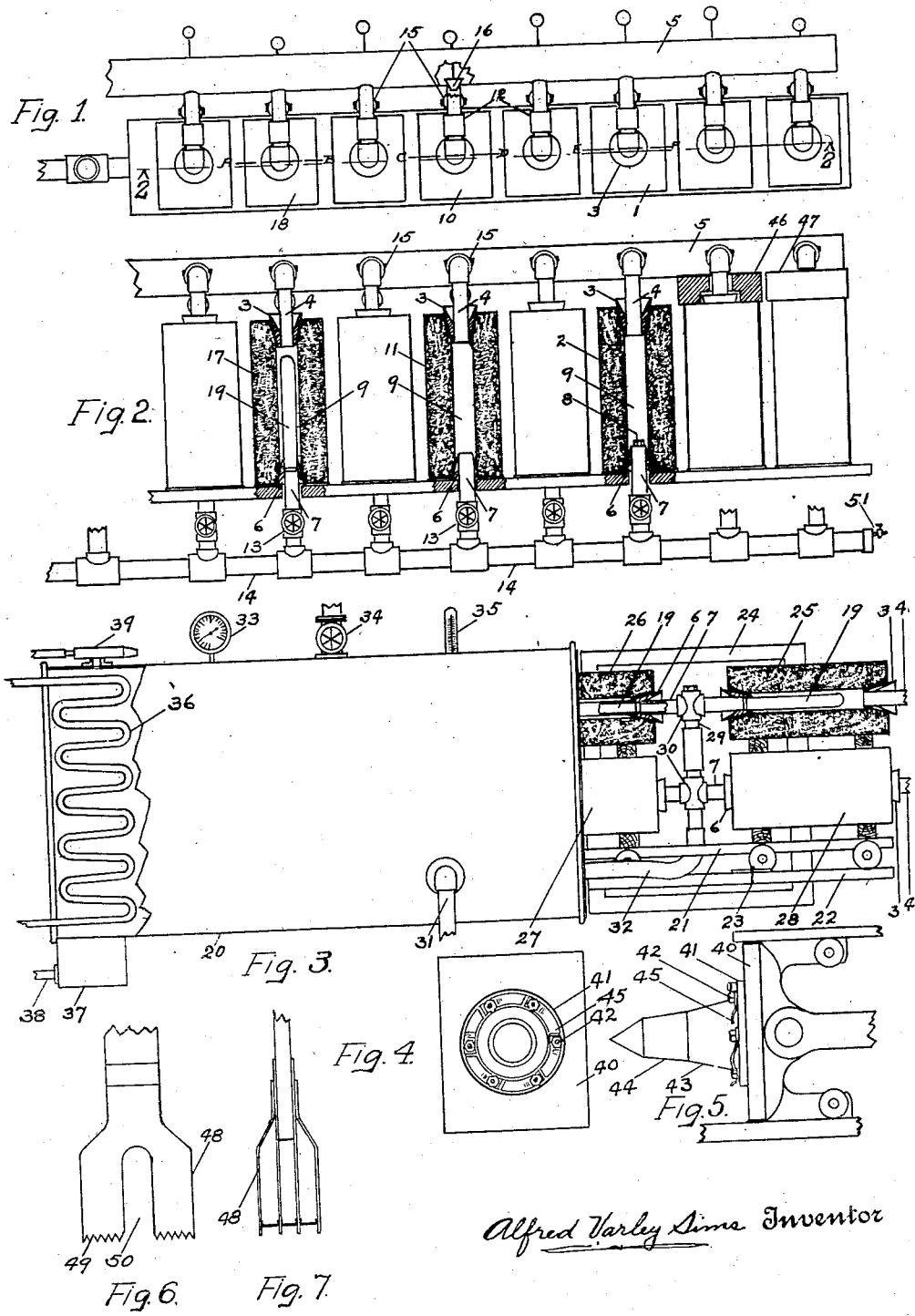
Alfred Varley Sims Inventor Patented Feb. 13, 1934

1,946,814

UNITED STATES PATENT OFFICE 1,946,814

HAY DRYING AND THE LIKE

Alfred Varley Sims, Brooklyn, N. Y.

Application August 20, 1929. Serial No. 387,112

10 Claims. (Cl. 34—24)

Among the objects of my invention are to enable hay and the like to be compressed immediately it is cut and to be cured in compressed form; to economize labor in harvesting and curing; to effect a process that will eliminate all losses now universally sustained by leaching, browning, stem rotting, mildewing, searing, mowburning, loss of aroma, loss of food value, etc. by sun, rain, dew, fog, etc. while it is being field-cured or dried as at present; to conserve the color and aroma of the hay in sensibly the conditions as when cut; to increase the palatability, digestibility, and nutrient value of hay; to enable hay, (grain or grass) to be cut earlier while in a more succulent state, and containing a higher percentage of nutrients, and yet be compressed and cured without danger of molding or otherwise damaging; to sterilize forage crops to prevent damage and deterioration when stored and to devitalize weed seeds; to enable hay to be raised profitably in the eastern part of the United States where the largest market is but where its production is most hazardous; to save economic waste by curtailing shipment of hay from the West where better haying weather prevails to the East where the main market is; to make hay harvesting practically independent of the weather; to enable hay plants to be cut younger, not only to increase the nutrient content but, to save their growing time on the land and thus permit another crop to be raised each year. Another important object of my invention is to avoid the necessity for large buildings for the storage of loose hay.

My processes herein described are radically different in principle, methods and mechanisms from any of those now in use. Instead of fluffing the green hay to be dried or cured I compress it and apply drying agencies to it in that condition. The stalks and stems of hay may be considered as practically impervious capillary tubes, channels or conduits, for storing and conveying juices or saps from the roots to the foliage and seeds. The leaves or foliage give up their moisture with comparative facility but the stems and stalks are relatively difficult to dry unless they are cut or broken up fine or crushed and split lengthwise.

In compressing the green hay into forms as a preliminary to drying in my processes the stems and stalks are not only broken at short intervals bu are crushed and split lengthwise, thus greatly facilitating drying. As will later be explained in detail much of the water in the juices will be extracted and ejected, as water, in a liquid instead of gaseous form, thus saving 960 British thermal units for each pound so disposed of.

In compressing the green hay into forms my processes in general, require that these forms shall be made with holes in them, or shall have holes made in or through them after they are formed, to facilitate the introduction into the masses of a heating mechanism or of drying gases or agents, or to facilitate exhausting the interior to draw gases or drying agents from the outside of the form through the masses and out from the exterior.

The shapes into which the compressed hay are made may be of any convenient forms that prove most suitable for the conditions and purposes, but they may be exemplified by the customary bale now generally used. I shall hereafter refer to bales as meaning any form of compressed hay or the like.

I have invented a very simple device described and illustrated herein, attachable to any ordinary presser, that will make holes clear through forms of any length while the hay is being baled, though as stated, holes may be made in or through them after they are compressed. The hole or holes being symmetrically placed the bales or forms may be superposed and so placed that the holes aline to facilitate drying or treating in groups.

Other objects than those specifically referred to, and ancillary thereto, will appear hereinafter.

In the accompanying diagrammatic drawing which illustrates the invention:

Fig. 1 is a plan view of apparatus for introducing the steam or other gas within the bundles of compressed hay with piping and conduit;

Fig. 2 is a view partly in side elevation and partly in section on the line 2—2 of Fig. 1;

Fig. 3 is a side elevation partly in section of a modified form of apparatus, comprising a container, for treating compressed hay under pressure or partial vacuum, two bundles of hay being shown in elevation and two in section;

Fig. 4 is a face or front elevation of a plunger with perforating device attached for making a hole in the hay while compressing;

Fig. 5 is a side elevation of the apparatus of Fig. 4;

Fig. 6 is a front elevation of a bifurcated feeder head; and

Fig. 7 is a side elevation of the bifurcated feeder head of Fig. 6.

Referring to the drawing, and first to Figs. 1 and 2, a bale of compressed hay 2 has a conical plug 3 inserted in the top of the hole or cavity 9 in the bale, and through this plug passes pipe 10

4 which connects with conduit or manifold 5. In the lower end of cavity 9 in the bottom of bale 2 is a conical plug 6. This plug is also shown as having a pipe 7 passing through it but stopped at the top end with the screw plug 8, making the plug 6 function as would be a solid plug. It is shown thus simply to avoid a separate drawing to illustrate a solid plug in the end of a hollow bale.

Any drying gas forced through conduit 5 and pipe 4 would be compelled to find escape out of the cavity 9 through the body of the compressed hay or the like of bale 2. If this drying gas should not be heated it would nevertheless in time completely dry and cure the bale though it would of course have no cooking or sterilizing effect. If, however, the gas should be heated hot enough to have a cooking or sterilizing effect it would at the same time materially shorten the time of curing and drying. If this drying gas be hot enough to convert the water of the juices in the hay into steam under the conditions as described, this steam would pass from in and near the cavity 9 in the lines of least resistance through the body of the compressed hay. As this steam came in contact with the damp or wet and cooler hay more remote from cavity 9 it would give up its latent heat and thus rapidly transfer heat by vapor convection currents into the body of the bale, and towards its outside. But in order to give up its latent heat it would have to be converted back to water. Thus the water of the juices of the hay in the interior of the bale would, through the medium of steam, be transferred to a zone around the central hole where it would lodge in the interstices between the strands or fibers of the compressed hay. This will tend towards, and in some conditions effectually accomplish, the plugging up of the bale to prevent the passage of light pressure drying gas.

By intermittent applications of pressure the expulsion of free water is hastened. The water so driven out has been extracted from the juices of the hay in the center of the bale. This hay so depleted of water will be more porous and will now offer less resistance to the flow of more hot gases to the yet wet hay more remote from the center. This application of hot gas will vaporize more water from the juices of the hay near the center of the bale to be carried to and condensed toward the outside and be driven out and drip off. If the bale becomes too hot to condense the steam efficiently unheated gas, such as air, may be forced through. This would absorb some heat to raise its temperature, but the amount absorbed in this way would be nearly negligible compared to that absorbed by evaporation and the latent heat of the vapor carried out. The alternate application of heated and cooling gases, both drying in their effects, can be accomplished automatically, and controlled either by time or by the temperature in the bale. Every pound of water thus eliminated from the juices of the hay, as water, will as before stated, reduce the heat necessary for volatilization and drying by the 960 British thermal units required for latent heat. But if conditions are such that economy or convenience dictate that the elimination of the saving incident to the expulsion of water instead of steam shall be sacrificed in the interest of time or of simplicity of mechanism, hot gases of any kind or combination may be continuously forced through the bale evaporating and volatilizing the water and driving it out as vapor.

Normally cured and dry hay contains up to 10% to 15% of moisture. When cured artificially by high temperature drying gases it will become too dry when the process is continued too long. When this occurs with any of my processes the overdry hay may be readily brought to the desired conditions of humidity by forcing humid air, steam, or other humidifying agents through the bales, or storing in a humid atmosphere for natural absorption to take place, which is materially assisted by the holes in the bales.

11, (see Fig. 2) is a unit of compressed hay or the like similar in all material respects both in form and equipment to the bale and connections just described except that in this case the screw plug 8 is omitted. By opening the valve 13 the pipe or manifold 14 is put in connection with cavity 9 through pipe 7. The pipe 14 may contain a gas at one pressure and temperature while the conduit 5 may contain the same or another gas at another pressure or temperature. If pipe 14 contains a gas materially above 212° F. in temperature the admission of it at low pressure through valve 13 and pipe 7 would vaporize the water of the juices in the hay nearest to the hole 9 and force the steam or vapor thus formed into the body of the hay toward the outside of the bale where it will condense on coming in contact with the cold wet hay. This condensate, or water out of the juices, obstructing the escape of the steam and hot gas, causes pressure to build up in the cavity 9. When this pressure becomes sufficient it will blow the condensate out of the hay and be followed by hot gas and vapor, which will soon make the entire bale so hot that condensation will not take place within the bale, and the vapor or steam, carrying its large latent heat to waste, will be blown out with the hot moist gas. When it is desired to conserve heat by expelling the water as condensate, instead of vapor, the valve 13 is closed and a cool drying gas, such as air, admitted through pipe 4. When the bale has been cooled, and somewhat dried, by the cool gas the hot gas is again applied, and the operation repeated. If conditions make it desirable the hot drying gas may be permitted to enter the bale until it has expelled so much of the water, and so reduced the sizes of the stems and other hay elements as to reduce the resistance to flow through it, the valve 13 may be closed and the rest of the drying be completed by air or other cheap gas at desired temperature. That is, a hot gas such as steam, carbon dioxide and products of combination, superheated steam, at considerable pressure, may be used to vaporize and blow out part of the water content and make the compressed hay more porous and less resistant to a flow of gas through the bale, and to effect such cooking or sterilizing as desired, and the rest of the drying and curing be effected by a cheaper hot, warm or cool gas. In all such operations when gas is admitted through pipe 7 the check valve 15 will prevent this gas blowing back or entering into conduit or manifold 5. The valve 16 is to prevent the escape of gas from 5 when a bale is being removed, or curing completed or the like. The removal and replacement of forms or bales is facilitated by the flexible connection 12. The small cock or valve 51 is to release air from pipe 14 when used for steam.

17 (see Fig. 2) is a unit of compressed hay or the like similar in all material respects both in form and equipment to the bale and connections just described except that in this case there is attached to the top of plug 6 a tube or pipe 19, closed at its top end, and preferably made of material of high conductivity such as copper.

With this arrangement it is evident, if the top plug 3 is either solid or connected as shown with the manifold 5 by pipe 4 but with check valve 15 preventing the flow of gas from the cavity 9 in the bale, that if steam is admitted from pipe 14 through valve 13 into the pipe or heating element 19 steam generated from the water in the hay will form in the space around the heating element and be forced out into the interstices between the hay elements. There it will condense and give up its latent heat to the cold wet hay, this condensate impeding the flow or exit of more steam forming from the heat given off by the tube 19. If the green hay is compressed so tightly that the initial condensate so solidifies it that both steam and water cease to escape the pressure, and temperature, in the space around the heating element or tube 19 will increase until they finally reach the same pressure and temperature as that of the steam inside the tube 19. This mechanism therefore, with any usual boiler pressure, contains a surplus of power for ejecting the obstructing condensate and effecting porosity for the flow of a drying gas from conduit 5 through the hay. When the whole bale becomes so hot the steam will no longer condense in the bale and give up its latent heat to the hay before it is ejected the supply of heat may be stopped by closing valve 13 and allowing the combination drying and cooling gas to flow from conduit 5 until the bale is cooled, when the valve 13 may again be opened and the operation repeated, to effect the ejection of the moisture in the hay in the form of water.

But if, because of the condition or water content of the hay or for any other reason, this object of the expulsion of the water as a liquid is not desired, this mechanism will cure any grade or condition of compressed hay automatically. Suppose the pressure of the steam in 14 is 30 or 100 pounds gage pressure and that of the drying gas in manifold 5 is say ½ or 5 pounds. By opening valve 13 the temperature in the heating element 19 will be 275° to 338° F. The pressure of steam around the tube 19, since it cannot escape through check valve 15, will increase until it forces escapement through, and porosity of, the bale. As this porosity of the bale increases due to the loss of water the pressure of steam around tube 19 will rapidly fall. When this pressure decreases below the predetermined pressure in conduit 5 the check valve 15 will automatically open and the drying gas, such as air, will be admitted into and around the hot pipe 19 where it will be heated and, by convection, transfer heat from the center to the body of the hay, there to be converted mainly into latent heat in the vapor it carried out with it. It is to be appreciated that after the tube or pipe 19 has converted the water in the hay that is near to it into steam it has only the convection of the imprisoned steam and the conduction of the practically dry fibres of the hay through which to transmit heat to the more remote and yet wet hay. Both of these are very poor vehicles of heat, hence the importance of the drying gas to be heated from the heating element 19 before passing out into the hay.

As the pressure of steam built up in the center of the bale forces relief through porosity the remaining steam will be progressively superheated as the pressure decreases. Also the drying gas coming in contact with the element 19 will be heated to a temperature beyond that corresponding with steam at the pressure obtaining and will superheat the steam with which it mixes, all of which will assist in carrying heat to, and effecting drying of, the hay remote from the center of the bale.

In some hays in some conditions, such as timothy as mature as when normally cut for natural sun and air curing, the bales may be so porous that practically no pressure will be built up by the formation of steam around tube 19. In such cases the drying gas may commence to flow at once and be continued until cooking and curing are complete. It will be noted that when any form of radiant interior heating is used in the bales, such as tube 19 or an electrical or other heating unit, the entire heat transmitted by such unit can be applied to the conversion of the water in the hay to steam at atmospheric pressure—excepting only a negligible amount lost by radiation from the outside of the bale.

While I have only referred to the heating element 19 deriving its heat from steam yet it is understood that any source of heat is equally applicable and within the scope of my invention. By using such gases as superheated steam, the results of combustion—largely carbon dioxide—, the temperature of the heating element could readily be greatly raised above that practicable of attainment with saturated steam as indicated hereinbefore, in which the condensate from the tube 19 is designed to flow back and be put in the boiler for re-evaporation. In the use of a gas not to be condensed in the heating element the latter would be so made that the hot gas would flow in one channel or opening, give up heat to the hay, and the relatively cool gas flow back through a separate opening or channel to be reheated and used again. That is, in using such non-condensing gases the heating element 19 would be so made that a relatively large volume of hot gas would flow into and through it from the source of heat and by another channel out of and back to the same source. In places where it is available and sufficiently cheap electricity may be used to supply the desired heat of the heating element 19.

Regardless of which of the processes herein described may be employed it is seen the velocity of the drying gas may be so regulated to the condition of the hay that as much of the heat as may be economical to use may be transferred before it is liberated. Hence, unlike any other processes so far devised, the conditions found to be most economical for a large number of bales can be used for a few bales without loss of efficiency. If breakdowns of harvesting equipment reduces the flow of hay to the curer no loss in efficiency in curing need result. Again, if hay of one quality and kind is coming in from one field at the same time that hay of another kind and quality is brought in from another, none of these processes will be disorganized, rendered less efficient per pound of water removed, nor produce finished product of different qualities. This also applies to the occasional load or field of cut hay that has been caught in a heavy rain. Each unit or bale is dried or cured independently and the process is continued on each unit until it is finished regardless of the condition of any other bales. The minimum capacity of the machine operating on these processes is one bale at a time; the maximum capacity is measured by the size of the heating plant and fan or blower and the length and number of pipes 14, and the number of connections on pipe 14.

When the hay elements, such as stalks and stems, lose part of their water content they become both smaller and more limber or pliable. The loss of size increases the void spaces for escape of steam or drying gases. Through lack of homogeneity steam and drying gases may find easier escape through certain portions of a bale, and the greatest drying and softening will take place in those portions. When this feature shall make correction desirable compression is applied to the bale, which solidifies the softer and more porous portions, again increasing the resistance to the escape of steam and drying gases so as to compel its more equal distribution through the mass. And, due to the high water content in certain types or conditions of hay which have been cured in compressed forms, the latter may call for solidification for shipment and the handling incident thereto. In such cases the bales are recompressed and secured by shortening the wire ties. In Fig. 2, 46 represents a cross section and 47 an elevation of a weight to accomplish the desired compression either during the curing or after it is cured, though this re-compression may be more effectually accomplished by mechanical means.

20 (see Fig. 3) is a diagrammatic representation of a receiver capable of withstanding an external working pressure of a partial vacuum, of say 25 inches of mercury, and an internal working pressure of 50 pounds or over for the purpose of utilizing the well known principle of the vacuum in evaporating as applied to curing, cooking and drying hay in a compressed form. 21 is a carriage designed to slide or roll on track 22, which is hinged at 23 to enable a section of it to be lifted out of the way after carriage 21 has been put in the receiver, so that the door 24 may be closed. On the carriage are shown four bales of hay, two of them, 25 and 26, sectionalized, and two, 27 and 28, in side elevation. These are shown with the heating elements 19 connecting through the plug 6 and pipe 7 to pipe 29 through the X connection 30. 31 is the main supply pipe, corresponding with pipe 14 of Fig. 2, and is connected with pipe 29 by the flexible pipe 32.

If truck 21 with its charge of bales be put into receiver 20, the door 24 closed and steam admitted to the tubes 19 a pressure and temperature would be gradually generated within the receiver which would be recorded on pressure gage 33. This pressure would be produced by air, and by the steam generated from the water in the hay by the hot tubes 19. The maximum pressure and temperature may, by guarding against loss by radiation, approximate that of the steam in the hot tubes. Each fibre and stalk of the hay, including their water constituents, will be of the pressure and at least the temperature of the receiver. If the liberal sized exhaust valve 34 is quickly opened the pressure will drop to approximately that of the atmosphere. The water in the hay elements will be of a temperature corresponding with that of the receiver before the valve 34 was opened. Therefore the internal, or exploding, pressure within the hay stalks or elements will be that of the receiver before it was exhausted. This internal explosive pressure will split and open such stems and stalks of hay as had not already been broken and split during baling, thus helping the escape and drying of the water.

If the steam formed in the receiver was twice the volume of the original air, or equivalent to two atmospheres, then on opening the valve 34 until the pressure became one atmosphere the receiver would contain one third air and two thirds steam at 212° F. If the valve 34 be again closed until the pressure of steam and the residual air is again built up and the exhaust valve again opened the air remaining will be a relatively small proportion. The valve 34 can now be closed and a cold liquid passed through the condenser pipe 36. In this way the vacuum in the receiver 20 may be made relatively high, reducing the boiling point of the water in the hay to a correspondingly low temperature. It will be appreciated that this will not only induce the well known evaporative effect of a vacuous condition in the presence of heat but will have a further rupturing or splitting effect on the stems and stalks, especially as a full supply of heat may be maintained in the centers of the bales.

The water thus taken out of the hay will appear as water or condensate in the bottom of the receiver and will drain to the hot well or sump 37 from which it is drawn off by a pump.

A thermometer 35 will record the correspondence or lack of correspondence of temperature and pressure and serve to indicate the necessity of using the ejector to lower the pressure, or increase the vacuum. Or an ejector or vacuum pump &c. may be used to produce the desired vacuum without employing valve 34, but in this case the rending effect on the stems and stalks of hay would be relatively small.

Instead of a surface condenser as shown a jet condenser can be used, thus producing a higher degree of vacuum in a given time and producing a greater bursting or rending effect on the hay. This would of course require a pump of larger capacity as the condensing water as well as the water from the juices would have to be handled by it.

If saturated or superheated steam be admitted through pipe 4 and plug 3, the desired cooking effect as well as the temperature and pressure in the receiver would be attained in a materially shorter time. The valve 34 could then be opened and air expelled as before and an equal explosive effect on the hay elements result.

To dry out any residual moisture a drying gas may be admitted through plug 3 and pipe 4 with valve 34 opened, or after door 24 has been opened, or the charge of hay taken out of the receiver.

I have spoken so far only of the removal of moisture from hay. Good, well cured hay should contain from about 10% to 14% of moisture. Except by a degree of skill not always obtainable hay cannot be artificially cured so as to leave a definite proportion of moisture. It can however be readily cured and produced practically dry. It can with facility after being dried in bales be humidified by putting vapor in the holes and through the mass, or by exhausting from the holes in a humid atmosphere until they have increased in moisture content a predetermined amount, as ascertained by weight or other means. If simply stored in normal atmosphere the bales, especially when hollow, will in time, like kiln dried wood, absorb the necessary amount of moisture, but this requires storage and time when early sale and shipment may be desirable.

To facilitate the re-absorption of moisture it is proposed prior to baling to add a non-volatile soluble hygroscopic substance such as sodium chloride which, in the limited quantity used, will increase the palatability of the hay.

There have been inventions heretofore made to perforate bales of hay, notably by B. Kingham, No. 970,930, September 20, 1910; by Joseph Dain, No. 1,045,125, November 26, 1912; and Owen D. Nolen, No. 1,376,568, May 3, 1921. All of these have encountered difficulty in withdrawing the perforator from the compressed hay without drawing the hay back into the feed box or chamber, due to the perforators being of uniform cross section. I overcome this difficulty by the simple expedient of making the perforator with a pointed end or pilot, and the body of one or more truncated cones or pyramids. Thus as soon as my perforator is moved at all in the withdrawal motion in the hay it will be loose and will not draw hay with it back into the feed box or chamber. This device, attachable to any baler head or plunger whether of the push or pull varieties, need be but short because as is well known no fibrous substances such as woodpulp, lint, shoddy, cotton, hay and the like will flow under pressure. Therefore, the hay, once compressed firmly around the perforator in the bale, will not flow into the hole to close it on the application of subsequent pressures. Hence a perforator disappearing into the plunger on the return stroke, so as not to obstruct the feeding of hay into the feed box, is not necessary with my form of perforator.

In Fig. 4 and Fig. 5, 40 is the face plate of a plunger of a compressor or baler to the face of which is attached the perforator flange 41 by the cap screws or bolts 42. In the illustration two truncated cones are used, the larger, 43, having its larger end or base at the plunger while to its smaller end is attached the base of the smaller truncated cone 44, the smaller end of which is fitted to a cone or pilot for piercing the loose hay as the plunger is driven forward on its compression stroke. On each succeeding stroke the portion of the perforator 44 will occupy that part of the bale occupied by the part 43 on the previous stroke. But it is seen that part 43 is of larger average diameter than part 44. Hence, in compressing each increment or charge of hay, while some little unpressed or loose hay may work into the imprint or form left by 43 on its previous stroke, the part 44, for the reason explained hereinbefore, will not be firmly compressed by the hay. Therefore, with a perforator formed of a truncated cone or pyramid, composed of two truncated forms, the elements of whose surfaces form different angles with their axes, the walls of the perforations will not be smooth or nearly impervious to low pressure gases or ventilation currents, but will be open and roughly corrugated, thus facilitating the objects for which the bale is made hollow, namely, cooking, curing, drying and re-humidifying.

Most modern balers or compresses for hay are equipped with mechanical means geared to work isochronously with the motion of the plunger for forcing the hay into the feed chamber. This usually consists of a feeder arm to which is attached a feeder head that presses hay down in the feed chamber while the plunger is withdrawn, and rises out of the way when the plunger advances on its compression stroke. To avoid interference with the cycles of motions of these parts I have devised a bifurcated feeder head, a front elevation of which is shown in Fig. 6 and a side elevation in Fig. 7, drawn to a different scale from that used in Figs. 4 and 5. In these figures 48 are the leaves or portions of the feeder head contacting with the hay and pressing it into place. 49 are serrations or teeth to prevent the hay from slipping from under the feeder head, and 50 is the opening provided to prevent conflict of the feeder head with the perforator on the plunger as it advances at the time the feeder head is being withdrawn. No other alteration will be necessary to the ordinary baler except to make holes for the perforator point to pass through the wooden separator blocks.

In the case of hays containing a large percent of juices, or that may have become wet as from rain, the pressure may so expel the air and liberate additional liquid from the stalks and stems that a suction may develop on attempting to withdraw the perforator. When such difficulty develops it may be overcome by the springs 45 whose function is to press the compressed hay back far enough to overcome the suction, or still friction, between the hay and the surfaces of the perforator, after which no adhesion will exist. This condition of wet hay also reduces the friction of the compressed hay in the bale chamber tending to reduce the solidity of the bale. This difficulty is overcome by placing wedge shaped resistance blocks in the bale chamber that slightly reduces the cross section of the bales.

Having described my processes and mechanisms what I claim as my invention is:—

1. The process of curing green herbage to form hay which consists in compressing the green herbage into a bale and forcing heated gases into said bale and causing them to percolate from an interior point of the bale outwardly through the herbage of the bale.

2. The process of curing green herbage to form hay which consists in compressing green herbage into a bale, forming an interior cavity in said bale and causing heated gases to percolate outwardly from said cavity through said bale.

3. The process of curing green herbage to form hay which consists in compressing the green herbage into a bale, forming a cavity in said bale and causing a hot non-oxidizing gas to percolate from said cavity outwardly through the hay of the bale.

4. The process of curing green herbage to form hay which consists in compressing the said herbage into a bale, forming a cavity in said bale, applying heat to said cavity and forcing gases into said cavity.

5. The process of curing green herbage to form hay which consists in compressing the green herbage into a bale and subjecting the bale to a partial vacuum in the presence of heat.

6. The process of curing green herbage to form hay which consists in compressing the green herbage into a bale, subjecting it to heat and pressure in a container and suddenly releasing the said pressure whereby the herbage elements are shattered and the flow of the herbage moisture into the leaves is caused, whereby drying is facilitated.

7. The process of curing green herbage to form hay which consists in compressing the green hay into a bale, forming a cavity in said bale and subjecting the said bale to a partial vacuum upon its exterior and supplying the cavity with heat.

8. The process of curing green herbage to form hay which consists in compressing the green herbage into a bale, forming a cavity in said bale, subjecting the exterior of the bale to a partial vacuum and supplying a drying gas to the said cavity.

9. The process of treating perforated compressed forms of hay or the like by plugging the openings of the cavities or perforations at one end and applying heat to the interior of the forms until steam from the central portion has condensed to water in the cooler parts of the mass, followed by an application of gaseous pressure to eject the condensate from the mass as a liquid and effect drying and cooling by evaporation, when the application of gaseous pressure is discontinued until the heat is again applied causing more steam from the central part of the forms near the perforations to be forced outwardly and condensed in the mass thus cooled by the evaporation induced by the expelling gas when the gaseous pressure is again applied to again effect the expulsion of the condensate as a liquid, and repeating this process as often as found desirable.

10. The process of curing green herbage to form hay which consists in compressing the green herbage into a bale, forming a cavity in the bale, subjecting the bale to a drying operation which is carried to a point beyond that desired and re-humidifying the bale by supplying moisture by forcing moist gas into the cavity and causing it to pass outwardly from said cavity through the herbage to bring the moisture content to the desired amount.

ALFRED VARLEY SIMS.